(No Model.)
H. H. MONROE.
DOUBLE ROTARY HARROW.
No. 264,324. Patented Sept. 12, 1882.
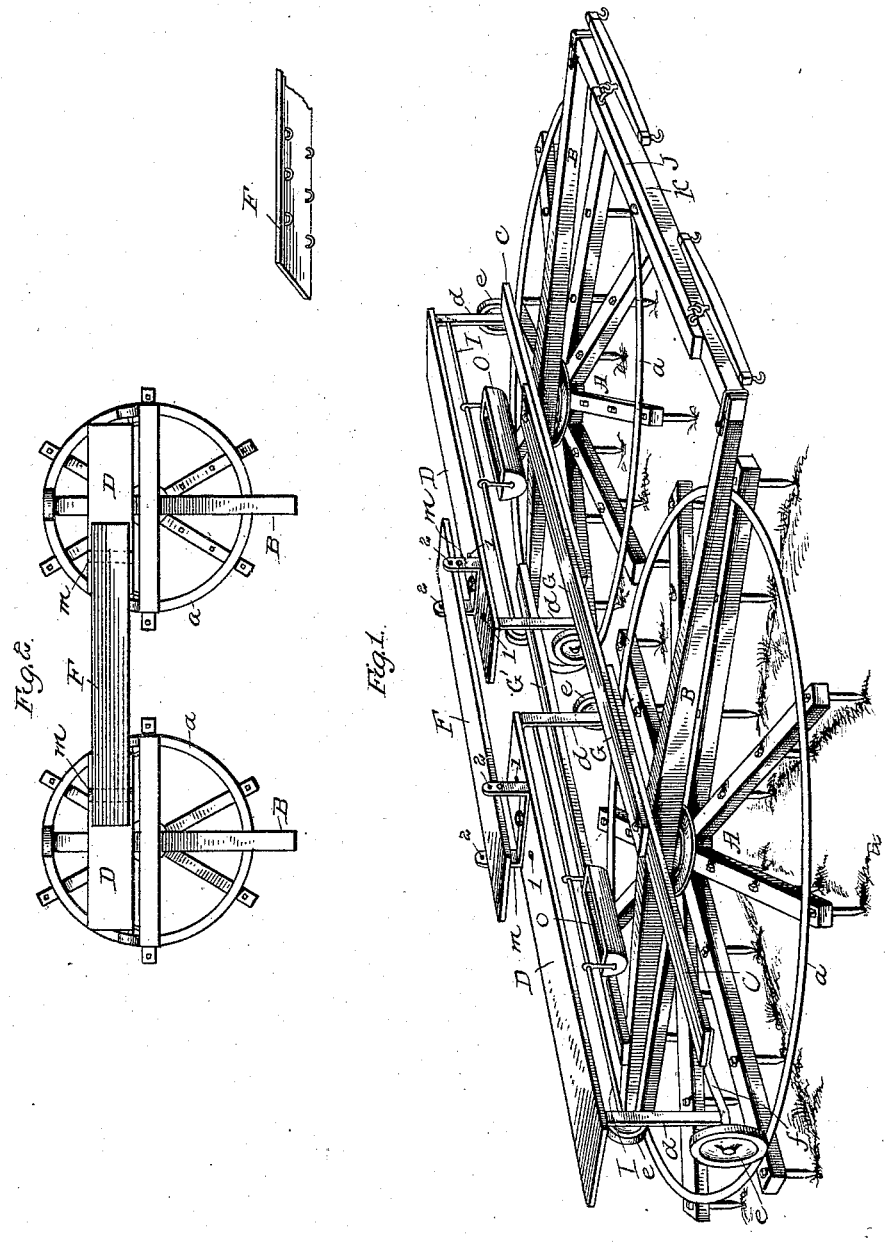

UNITED STATES PATENT OFFICE.

HALSEY H. MONROE, OF THOMASTON, MAINE.

DOUBLE ROTARY HARROW.

SPECIFICATION forming part of Letters Patent No. 264,324, dated September 12, 1882.

Application filed August 9, 1882. (No model.)

*To all whom it may concern:*

Be it known that I, HALSEY H. MONROE, of Thomaston, in the county of Knox and State of Maine, have invented a new and useful Improvement in Double Rotary Harrows; and I do hereby declare that the following is a full, clear, and exact description of the same.

My invention is an improvement in rotary harrows.

It consists of a double harrow and central seat bearing upon the inner edge of the harrows, and of certain improved details of construction whereby the rotary harrow and the elongated seat described in Letters Patent granted me on the 29th day of June, 1880, are embodied in and adapted to a double harrow. The rotary harrow shown in my said patent has great advantages over other forms of harrows, but cannot, without incurring serious disadvantages, be increased in width or diameter beyond a certain narrow limit. I have sought, therefore, to combine the advantages of the rotary harrow with the desired width by duplicating the rotary harrows in one instrument and in combining therewith a central seat bearing upon the inner edge of the harrow, and the elongated seat and adjustable weights.

The accompanying drawings show a perspective view of my invention in Figure 1, and Fig. 2 is a modification.

In the drawings, the rotary harrows are marked A A. They are in construction the same as those described in my patent aforesaid, and are preferably made about four feet in diameter. A bracing-ring, $a$, is placed upon each and fixed to each radial arm at a point a little within the outer extremity of each arm. They are pivoted by a central bolt one upon each of the beams B B, to which the draft is applied either directly or indirectly. Upon each harrow I mount a seat, D, which is supported upon brackets $d$, which are mounted upon wheels $e\ e$, which wheels ride upon the ring $a$ as a rail. The beams B B extend to the rear, and are provided with wheels $e$, which bear also upon the ring and serve to keep the harrows in proper position. The brackets $d$ have forwardly-projecting arms $f$, upon which is placed a foot-rest, C, the center of which rests upon and is bolted or nailed to the beam B. These parts do not materially differ from those in my former patent. The two beams B B are placed at a distance from each other a little less than twice the length of the radial arms of the harrow, so that the harrows slightly interlock. Upon the seats D in brackets $m$, I place a supplemental seat, F, which connects the two seats D D, and the driver upon the supplemental seat may throw more or less of his weight upon the seats D by shifting his position to one end or the other. A central foot-rest, G, of preferably oak board, extends from the beams B B, to which it is bolted by a single bolt at each end, the bolt passing down through the foot-rest C to bring the supplemental rest G directly over the former. This braces the beams B B, and these are further braced by another piece, G', fixed in like manner across the machine in the rear of the seat. The beams B B may be further braced by a cross-piece, K, to which the evener J may be attached. I prefer, however, to attach the hooks for the whiffletrees directly to the ends of the beams B, and if a third horse be used to attach the hook for that horse to the middle of the cross-piece J. Rods I and adjustable baskets O for weights are placed upon the brackets, as described in my former patent. The whiffletrees may be hooked to the beams B B, so as to give a twisting force inwardly, which will tend to press down the harrows on the inner side when the machine is used as a driving-harrow.

It will be observed that while the harrows have free independent rotary movement, and the weight of the driver as he sits in the center of the seat causes the inner parts of the harrow to be depressed, so that the two harrows rotate toward each other on the front, the driver may shift his position to the extreme end of either seat D and cause any one of the harrows at will to rotate in the opposite direction without stopping the harrow.

The cross piece rests on the supplemental foot-rest, maintaining the frame in the same plane, while the harrow is perfectly free to turn, as well as the independent harrows to revolve freely, and the whole seat-frame moves freely upon and with the independent harrows.

When the machine is used as a driving-harrow the weighted baskets O may be readily shifted from side to side by the driver walking in the rear whenever it may be desirable to reverse the rotation of any harrow in order to clear it from clogging.

By this construction I combine all the advantages of a rotary harrow with any desired width, and secure at the same time the advantages resulting from the elongated seat, and the facility with which the driver may place his weight upon any part of the machine, so as to cause both harrows to revolve inwardly or either to revolve outwardly; but it is of special importance that by the construction described the weight of the driver as he sits in the center will bear on the inner edges of the independent harrows by depressing them and cause them both to turn. This results from the special construction of the seat-supporting devices, which are of comparatively thin flexible material, and spring sufficiently to let the weight of the driver come upon the inner parts of the harrows, while at the same time the cross-connections are stiff enough to hold the harrow in place in the same plane.

The weight of the rider may be adjusted to the degree required to turn the harrow by shifting the supports of the seat. These consist of brackets $m$, which are connected to the boards D by bolts and thumb-nuts. A series of holes, 1 1, is made in each of the boards D, so that the brackets may be set nearer to or farther from the center of the harrows, and thus the weight or pressure on the edges of the harrows be lessened or increased. The board or seat F rests upon a cross-bolt at each end, to which it is attached by staples, there being a series of these corresponding to the holes 1 1. The bolt is passed through any of a series of holes, 2 2, in the vertical arms of the bracket, and thus the height of the seat is adjusted to suit the height of the driver. The central bolt, which holds the bracket to the seat D, serves as a pivot to allow whatever twisting motion may be necessary.

The construction above described is capable, by slight modification, of application and use as a straddle-row cultivator. For this purpose the independent harrows are made of smaller diameter—say thirty inches—and are separated as far as may be necessary to straddle the row of corn. In Fig. 2 I have shown this form. In this figure the independent harrows A A are held apart by means of the central seat, which is held to the two seats D D in the manner heretofore described. For small harrows like this the cross-pieces G G' may be omitted and the two harrows be held apart by means of the seat F alone. In this case the seat is fastened to the cross-bolts by means of the staples, and the distance between the harrows is increased or diminished by shifting the brackets $m$ $m$ in or out. This construction leaves space between the harrows and the seat for the corn, and the vertical adjustment of of the seat adapts it to the height of the corn.

I am aware that double rotary harrows are very old, and I do not claim broadly such double harrows; but I do not limit myself to the elongated seat, my invention being useful with a central narrow seat, provided the construction be such as described, whereby the weight of the driver is brought upon the inner edges of the harrows.

Having thus described my invention, what I claim is—

1. In a double harrow, the combination of beams B B, extending from front to rear, and provided with wheels $e$, bearing upon the ring $a$, and flexible cross-pieces G G', substantially as described.

2. In combination with the rotary harrows A A, the independent seats D D, supported upon brackets and wheels, as described, and the supplemental seat F, supported on the ends of the seats D D, substantially as described.

3. The combination of the independent rotary harrows A A, the beams B B, the foot-pieces C, supported upon the brackets, as described, and the supplemental foot-piece G, bolted to the beams B, as set forth.

4. The combination of the independent rotary harrows A A, the beams B B, independent seats D, and supplemental cross-pieces G G', substantially as described.

5. In combination with the double harrow having independent rotary harrows A A, an elongated seat supported upon brackets and wheels running upon the rings $a$ $a$, said seat extending across the two independent harrows, substantially as described.

6. A double rotary harrow consisting of two independent harrows, A A, draft-beams, and cross-pieces connecting the draft-beams, whereby the independent harrows are held in proper relation to each other, and a seat supported upon the harrows, whereby the weight of the driver is made to depress one side of both harrows and cause them to rotate, substantially as described.

7. In a double rotary harrow, the combination of the seats D D, the brackets $m$ $m$, and the seat F with vertically-adjustable rods, forming seat-supports, substantially as described.

8. The combination, in a double rotary harrow, of the seat F and seats D with laterally-adjustable brackets, whereby the central pressure may be regulated, substantially as described.

In testimony whereof I have signed my name to this specification in the presence of two subscribing witnesses.

HALSEY H. MONROE.

Witnesses:
F. L. MIDDLETON,
WALTER DONALDSON.